United States Patent [19]
Lund

[11] Patent Number: 5,570,230
[45] Date of Patent: Oct. 29, 1996

[54] RETROREFLECTOR FOR LASER GEODESY WITH OMNIDIRECTIONAL CORRECTION OF SPEED ABERRATIONS

[75] Inventor: Glenn Lund, Peillon, France

[73] Assignee: Aerospatiale Societe Nationale Industrielle, France

[21] Appl. No.: 364,481

[22] Filed: Dec. 23, 1994

[30] Foreign Application Priority Data

Dec. 31, 1993 [FR] France ................................. 93 15973

[51] Int. Cl.$^6$ ........................... G02B 5/12; G02B 5/08; B64G 1/36
[52] U.S. Cl. .................... 359/529; 359/527; 359/850; 342/6; 342/7
[58] Field of Search .................... 359/529, 527, 359/850, 851, 853; 342/7

[56] References Cited

U.S. PATENT DOCUMENTS

| | | | |
|---|---|---|---|
| 2,172,660 | 9/1939 | Koubek | 359/534 |
| 2,746,035 | 5/1956 | Norwood | 342/7 |
| 3,117,318 | 1/1964 | Jones | 342/7 |
| 3,308,464 | 3/1967 | Lewis | 342/6 |
| 3,451,060 | 6/1969 | Edwards | 343/7 |
| 3,480,232 | 11/1969 | Wyatt | 244/167 |
| 3,567,155 | 3/1971 | Gatlin et al. | 244/167 |
| 3,582,020 | 6/1971 | Wrench | 244/167 |
| 3,833,285 | 9/1974 | Heenan | 359/551 |
| 4,096,479 | 6/1978 | Van Buskirk | 343/18 |
| 4,241,349 | 12/1980 | Connell | 343/18 |
| 4,551,726 | 11/1985 | Berg | 343/18 |
| 4,733,236 | 3/1988 | Matosian | 342/7 |
| 4,964,722 | 10/1990 | Schumacher | 356/152 |
| 4,996,534 | 2/1991 | Broadhurst | 343/912 |
| 5,097,265 | 3/1992 | Aw | 342/7 |
| 5,202,743 | 4/1993 | Lund et al. | 356/5 |
| 5,474,264 | 12/1995 | Lund et al. | 244/171 |

FOREIGN PATENT DOCUMENTS

| | | |
|---|---|---|
| 0506517 | 9/1992 | European Pat. Off. . |
| 0571256 | 11/1993 | European Pat. Off. . |

OTHER PUBLICATIONS

Applied Optics, vol. 31, No. 28, Oct. 1, 1992, New York, pp. 6015–6020; Minato et al, "Optical Design of Cube–Corner Retroreflectors having Curved Mirror Surfaces".
NASA Report A–524–63–59, Feb. 13, 1959.
IEEE Transactions on Geoscience and Remote Sensing, vol. GE–23 No. 4, pp. 398–413.
Raumfahrtforschung, vol. 13, Oct. 5, 1969, pp. 228–235.
La Recherche Spatiale, vol. 10, Oct. 5, 1971, pp. 15–18.

Primary Examiner—Paul M. Dzierzynski
Assistant Examiner—Mohammad Y. Sikder
Attorney, Agent, or Firm—Remy J. VanOphem; John VanOphem; Thomas A. Meehan

[57] ABSTRACT

A cube-corner retroreflector for laser telemetry corrects speed aberration $\delta$ and has three substantially orthogonal mirror surfaces defining three substantially orthogonal edges converging at an apex. Each edge is associated with the surface substantially orthogonal to it. The shape of each surface is at least approximately that of a portion of a cone whose axis is coincident with the associated edge. The generatrices of this portion of a cone have a non-null average generatrix slope relative to a plane perpendicular to the axis of the portion. The average $\alpha_0$ of the average slopes of the surfaces at least approximately satisfies the equation:

$$\alpha_0 \approx 0.2\delta/k$$

where $k$ is a predetermined parameter dependent on the number, the geometry and the refractive index or indices or the media constituting the interior volume of the retroreflector.

14 Claims, 5 Drawing Sheets

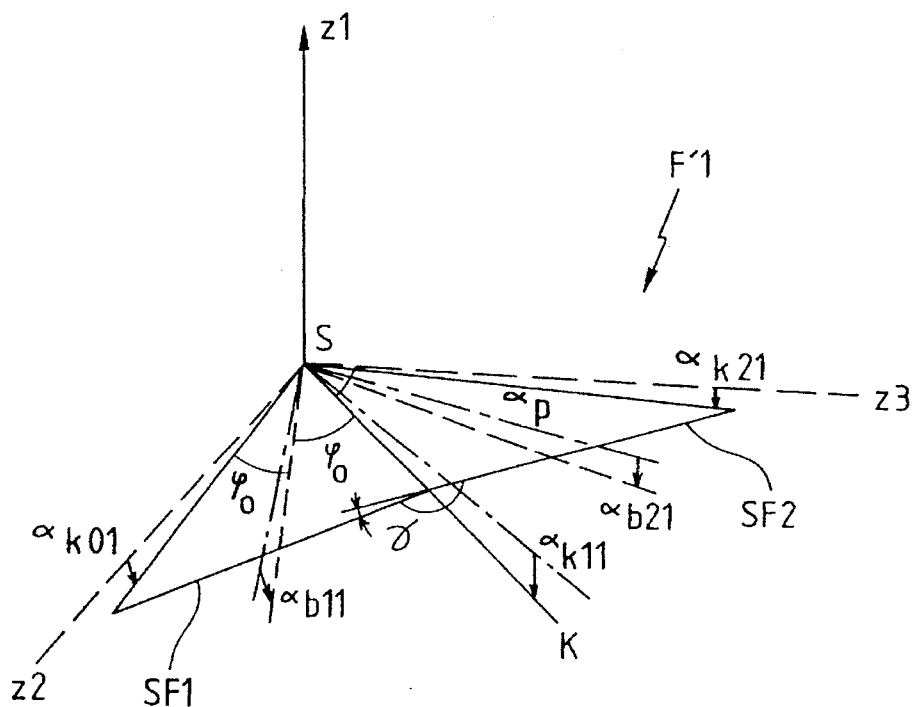
Fig. 4
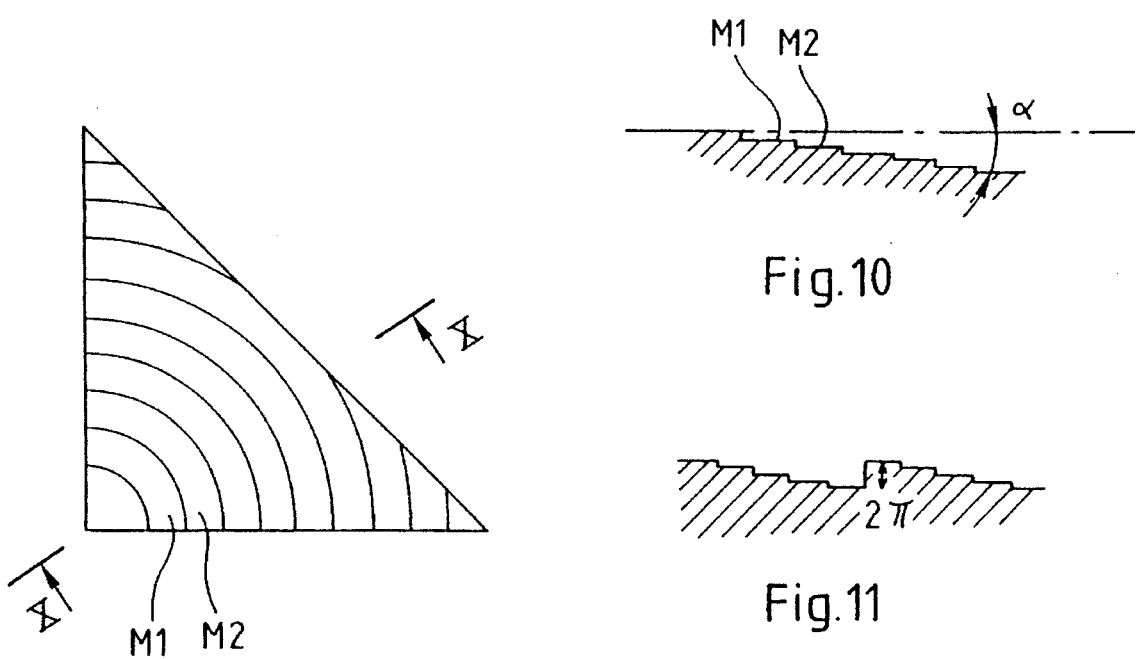
Fig. 10
Fig. 9
Fig. 11

5,570,230

RETROREFLECTOR FOR LASER GEODESY WITH OMNIDIRECTIONAL CORRECTION OF SPEED ABERRATIONS

BACKGROUND OF THE INVENTION

1. Field of the Invention

The present invention concerns laser telemetry, in particular laser telemetry between two artificial bodies (for example, satellites in orbit or spacecraft) and/or natural bodies (for example, the Earth, the Moon or other planets) moving relative to each other with a transverse relative speed approaching or even exceeding a value in the order of one kilometer per second.

2. Description of the Prior Art

At present laser telemetry measures the time taken by a laser pulse to make the journey between a terrestrial laser station and a satellite (or the Moon) and converts the measured time into an "instantaneous" distance between a reference point of the laser station and the center of mass of the satellite (or a reference point, on the Moon) for example, correcting for various deterministic effects.

In the following description, the term laser telemetry is to be understood as referring to a measurement of the distance in either direction between satellites or, more generally, between natural or artificial heavenly bodies.

It should be borne in mind that all "laser" satellites currently in orbit around the Earth (e.g. the LAGEOS I and II, AJISAI, STARLETTE and STELLA satellites) were designed at a time when laser telemetry was somewhat inaccurate and the lasers employed were somewhat lacking in power (compared to what is available today). These satellites were therefore optimized to provide many small "cube-corner" retroreflectors capable of reflecting a detectable quantity of light to the transmitting station, whatever the orientation of the satellite. It was not very important that these retroreflectors were not all at exactly the same distance from the transmitting station, to within a few centimeters or within a few decimeters.

In recent years the situation has changed greatly, with the result that in present day laser telemetry stations the pulse duration of the laser can be as low as ten picoseconds (ps) (1 ps=$10^{-12}$ seconds). The accuracy of measurement with a single echo from a laser having such small pulse duration is approaching one millimeter. However, the same cannot be said of the final measurement accuracy, in particular, because of the multiplicity of echos (one echo from each retroreflector visible from the laser transmitter at the time a pulse is transmitted) which space out the return pulses in time, there being no accurate way to associate each individual echo with the instantaneous distance between the center of mass and the satellite and the laser station.

The relative speed of the satellite and the laser station causes a speed aberration phenomenon which is corrected on existing satellites by making the angles between the mirror surfaces of the basic cube-corners slightly different from the nominal value of 90°.

Also, these cube-corners, which are usually solid, are deliberately made small (3 to 4 cm in diameter), for two reasons:

(1) because of the small corner angle defects, the diffraction pattern of the light wave that they reflect is a sort of continuous ring whose radius and width correspond to the values necessary for adequate compensation of speed aberration, rather than six distinct and separate lobes, and (2) because the cube-corners are small, the temperature gradients that occur within the glass from which they are made remains small, and consequently cause little degradation of the resulting diffraction pattern.

By choosing a small size, for the reasons explained above, reflectors are obtained whose efficiency (expressed as a fraction of the incident energy reflected to the transmitter) is low. Given the mean energy of the pulses transmitted by laser telemetry stations of 10 to 15 years ago, it was necessary to equip satellites with a large number of reflectors so that a sufficient quantity of light could be returned to the receiving telescope. Accordingly, all these satellites currently in orbit use the same principles and employ many cube-corners (from 60 to more than 2,000) with the result that their optical efficiency is virtually independent of their orientation relative to the transmitting station. The inevitable consequence of the above is a spreading in time of the reflected pulse (characterized by a "signature").

Even with highly sophisticated laser telemetry tools, this spreading effect makes it virtually impossible to determine the distance of satellites with an absolute accuracy better than one centimeter using a single transmitted pulse.

Against this background, the following requirements have to be met, if possible:

return to the transmitting station receiver of a sufficient quantity of energy, adequate correction of speed aberration, and minimal "signature" (it is accepted that it is not essential for the retroreflection efficiency of the satellite to remain constant during movement of the satellite, which may not be known accurately);

elimination of any influence which could widen the pulses reflected by the satellite;

regardless of the geometry with which the light pulses impinge on the satellite, virtually no uncertainty (ideal accuracy is 1 mm or better) in determining the distance between a reference point of the laser station and the center of mass of the satellite from the measured distances to the retroreflectors.

In the context of the requirements of geodesy as mentioned above, European Patent A-0 506 517 and French patent application 92 05989 of 18 May 1992 propose to mount a small number of large retroreflectors on a common structure to constitute a geodesy microsatellite enabling existing and future stations to achieve an accuracy in the order of one millimeter for measuring large distances.

The use of large hollow cube-corner retroreflectors (CCR) rather than the solid variety used on existing satellites should result in an adequate energy balance for the satellite plus CCR system. Given the energy and the duration of the pulses transmitted by modern laser telemetry stations, assuming orbits for this type of satellite between 300 km and 6,000 km above the Earth, and allowing for the angular spreading of the energy retroreflected by the CCR and the typical size of the receiving telescope of a station of this kind (i.e. an iris diameter in the order of 50 cm), it can be shown that a single retroreflector with an entry diameter typically between 10 cm and 20 cm can satisfy the energy balance requirements of the system.

It is accepted that the duration (half-amplitude width) of the laser pulses transmitted can typically be between 10 ps and 50 ps and that, strictly speaking, a single photon detected is sufficient to identify a CCR and to determine its distance (as is currently the case in laser telemetry between the Earth and the Moon). The uncertainty of any such measurement depends on the energy of the pulses detected; to a first approximation, it varies in inverse proportion to the square root of the number of photons detected. For example, if a 50 ps pulse gives a measurement uncertainty of 1 mm for ten photons detected at the receiver, the same result would probably be achieved for a single photon in the case of a 15 ps pulse. Note that this type of reasoning, valid in the case of a single echo, cannot be applied to conventional laser satellites because of the multiplicity of return echos which introduces an ambiguity as to the relation between the distance measured to the reflectors (which is dependent on the photons detected) and the (required) distance to the center of mass of the satellite, the distance being in each case that from the laser transmitter/receiver.

As indicated in the previously mentioned Europen Patent 0 506 517, if post-processing of the distance measurements is applied, the accuracy of the corrected measurements can be much greater than their intrinsic individual accuracy.

It is possible to determine a retroreflector diameter sufficient to avoid the need for very severe tolerances for the optics of its mirror surfaces. The same energy balance (or mean number of photons detected per pulse transmitted) requirements can be met with a very small number of large hollow CCR, rather than a large number of small CCR. Note that, unlike the solid CCR currently used on conventional laser satellites, there is no practical upper limit as to the size of hollow CCR.

For example, the inventors know of a 50 cm diameter CCR for the Japanese Agency ADEOS satellite (R.I.S.).

The previously mentioned French patent application 92-05989 discloses a set of eight cube-corners having their apexes close together, producing single and unambiguous return echos.

In the case of hollow cube-corners having their apexes close together, only incident rays at a grazing angle to the mirror surface of one of the cube-corners (and consequently of no utility on return to the station) may be in the area of visibility of one or more adjacent CCR. As this is a rare case, it can be assumed that this configuration is characterized by non-overlapping of the field of view of the retroreflectors, i.e. a single detected echo.

The problem therefore arises: of correcting the speed aberration in the case of a single large retroreflector if it is necessary to avoid any constraints in terms of attitude control or more generally in terms of the relative orientation of the laser transmitter/receiver (T/R) and the CCR.

The invention is directed to solving this problem in the context as already explained.

It is obvious that the most general solution for correcting the speed aberration in the case of a non-stabilized satellite is to have a diffraction pattern at infinity of each of the retroreflectors which is in the form of a uniform ring bordered by limited curves corresponding to angular distances equal to the extreme values of the speed aberration to be corrected (for example, typically between six seconds and ten seconds of arc for a satellite in orbit 800 km above the Earth).

French patent application 92-05989 proposes a solution with only two diffraction lobes, but this is feasible only if the relative orientation of the T/R and the CCR is known in advance and remains substantially constant.

In the general case where this relative orientation varies in time or is not known accurately, it would seem necessary to retain an annular shape for the diffraction pattern; as already explained, this cannot be done in combination with a high received energy flux (relative to the transmitted flux) for large distances between the T/R and the CCR.

To achieve this the invention proposes to impart to the wave surface after reflection a shape as close as possible to a cone. To achieve this deformation of the reflected light wave the invention proposes the use of a CCR whose mirror surfaces are at least approximately slightly conical, either continuously or discontinuously (stepped).

SUMMARY OF THE INVENTION

The present invention consists in a cube-corner retroreflector for laser telemetry adapted to correct speed aberration $\delta$ including three substantially orthogonal mirror surfaces defining three substantially orthogonal edges converging at an apex (S), each edge being associated with that of the surfaces which is substantially orthogonal to it, wherein:

- the shape of each surface is at least approximately that of a portion of a cone having an axis coincident with the associated edge, the generatrices of this portion of cone having a non-null average generatrix slope relative to a plane perpendicular to the axis of the cone portion, the average slope of the surface for all the generatrices being also non-null relative to the plane,
- the three surfaces have their respective concave side facing in the same direction relative to all of the three surfaces,
- the local slope along any generatrix of each surface is constant to within 20%,
- the average slope of each generatrix of each surface is within 30% of the average $\alpha_0$ of the average slopes of the three surfaces,
- the average $\alpha_0$ of the average slopes of the surfaces at least approximately satisfies the equation:

$$0.2\delta/k$$

where $k$ is a predetermined parameter dependent on the number, the geometry and the refractive index or indices or the media constituting the volume of the retroreflector.

According to preferred features of the invention, some of which may be combinable with others:

- at least one surface is formed by at least two triangular plane facets contiguous at a break line, the edges of each facet having, relative to the plane perpendicular to the axis of the surface, substantially equal slopes,
- each surface is made up of substantially identical facets, and preferably each surface is made up of two identical facets, and the three surfaces are identical
- Each surface has along its generatrices at least one succession of coaxial steps (M1, M2), adjacent steps defining a local generatrix slope,
- the surface includes at least two successions of parallel steps separated by a transition whose height parallel to the axis of the surface corresponds to a phase step equal to a multiple of $2\pi$ at least equal to one,
- the local slope of the generatrices of at least one of the surfaces varies with the distance from the apex,
- the local slope varies monotonously, and
- the slope of the generatrices of a surface varies circumferentially between the edges flanking the surface, preferably,
- the volume of the retroreflector is empty and the value of the coefficient $k$ is 1, or alternatively
- the volume of the retroreflector is constituted by a homogeneous material of refractive index $n$ and the value of the coefficient $k$ is given by the equation:

$$k = n \cdot \frac{\cos[\arc\sin((\sin i_o)/n)]}{\cos i_o}$$

where $i_o$ is at least approximately 30°.

Futher, the volume of the retroreflector includes along reflective surfaces of the mirror surfaces homogeneous plates with refractive index $\underline{n}$ and is empty between the plates and the value of the coefficient $\underline{k}$ is given by the equation:

$$k = \sqrt{3} \cdot \cos[\text{Arcsin}(\sqrt{2/3} \cdot 1/\underline{n})]$$

Note that a curved surface CCR has already been proposed (this is the R.I.S. device previously mentioned); it is the subject matter of the article "Optical design of cube-corner retroreflectors having curved mirror surfaces", MINATO, SUGIMOTO and SASANO - Appl. Opt. Vol. 31, n° 28, p 6015, 1992. This article describes a way of widening the diffraction lobes using curvature of one to three of the mirror surfaces in conjunction with correction of one of the dihedron angles of a hollow cube-corner. However, this approach is intended for use of a CCR on a stabilized platform, where the combination of the effects of curvature of the surfaces with the known effect of correcting a single dihedron angle produces two wider diffraction lobes on the ground. This solution is not intended for applications in which the orientation of the reflectors is not stabilized, and does not provide either for the use of conical surfaces or for the generation of a diffraction lobe having an annular shape.

In reality the departure of the shape of the mirror surfaces from a perfect plane is very small, being typically a few multiples of the wavelength of the radiation to be reflected (which is typically in the "visible" or near infrared band, between 400 nm and 1,200 nm). For implementing conical surface cube-corners of the necessary optical quality, consideration could be given to using polishing, photo-etching or replica techniques, or a combination thereof.

Another feasible approach is to use a discontinuous shape for the CCR surfaces by "splitting" one or more of the three surfaces into an arrangement of juxtaposed plane facets. Accordingly, the surfaces can be formed of triangular plane facets (or facets of any other shape with two edges converging at an apex) centered at the apex of the CCR and inclined relative to each other, touching each other at their edges to produce a continuous surface similar to a portion of a very flat chinese umbrella with circumferential variations in slope. This is a discontinuous approximation of the "continuous" conical shape referred to hereinabove.

The overall diffraction pattern obtained in this way is a distribution of luminous energy forming a kind of polygonal ring which constitutes an acceptable approximation of the ideal uniform ring.

Imperfect solutions can also be acceptable, giving rise to diffraction patterns which are either incomplete or only partially annular, depending on the angle of incidence at the cube-corner; given the relatively high frequency (typically in the order of 10 Hz) of modern laser telemetry over large distances, and the fact that the angle of incidence of the pulses relative to the normal of the CCR can vary in time due to relative movement between the CCR and the transmitter/receiver T/R, it is generally accepted that a reasonable percentage (50% or even more) of null or low-energy returns can be tolerated provided that there are from time to time (at least in the order of once per second) return signals of sufficiently high energy for the requirements of the measurement (this is to approximate telemetry between ground stations and reflective panels on the Moon, although in this application the frequency of "good" returns (i.e. comprising at least one photon) is typically less than once every five seconds).

This means that imperfect annularity of the CCR diffraction pattern can be tolerated, giving rise to a succession of echos which vary between high and low energy, depending on the instantaneous relative orientation of the T/R and the CCR.

Other objects, features and advantages of the invention will emerge from the following description given by way of non-limiting example with reference to the appended drawings.

BRIEF DESCRIPTION OF THE DRAWINGS

FIG. 1A is a diagrammatic perspective view of a cube-corner retroreflector of the invention including imaginary planes and cones.

FIG. 4 is a diagrammatic view of a retroreflector surface formed by two plane facets.

FIG. 9 is a top view of a retroreflector surface in the form of parallel annular steps.

FIG. 10 is a view of the surface from FIG. 9 in section on the line 10—10.

FIG. 11 is a view in section of another surface with a plurality of groups of steps.

DETAILED DESCRIPTION OF THE PREFERRED EMBODIMENTS

Figure 1:
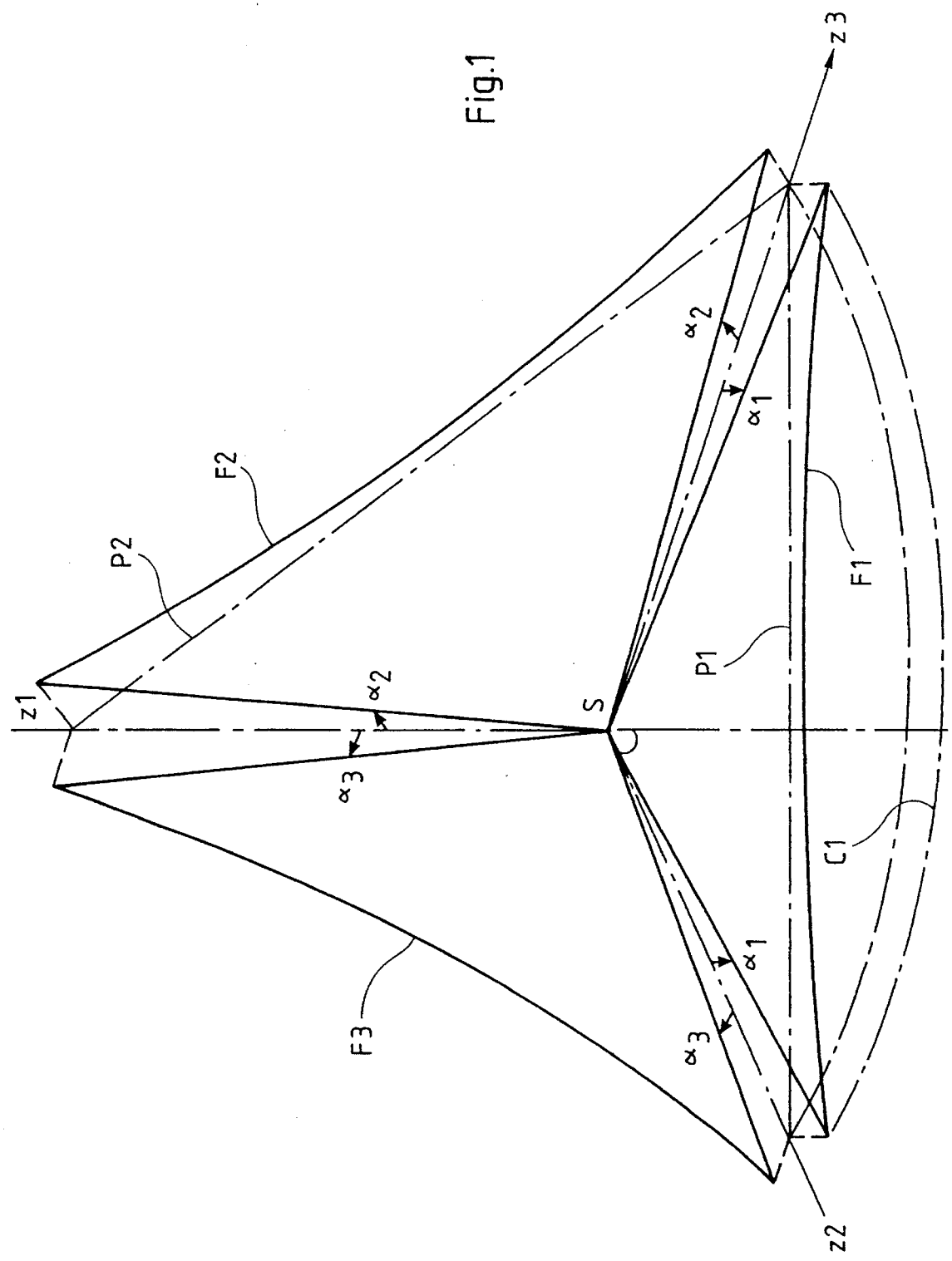
FIG. 1 is an identical view of the cube-corner retroreflector of FIG. 1A omitting all imaginary lines.

Referring generally to the drawings and in particular to FIG. 1A and 1B, the cube-corner retroreflector (CCR) 1 is shown. The CCR retroreflector can be mounted on a microsatellite (a satellite with a mass of less than 100 kg to 200 kg), for example a satellite dedicated to a geodesy mission, or on a larger satellite for any mission (remote sensing, for example), with the requirement to track its position and orbit accurately (for example for calibrating the instruments), or on another heavenly body such as the Moon, or on the Earth in combination with a transmit/receive station on a satellite.

The CCR retroreflector 1 is advantageously hollow. Compared to a solid geometry, this reduces the mass, eliminates most of the optical deterioration caused by thermal gradients in the glass and makes implementation much easier, even for larger retroreflectors (entry "diameter" of at least 10 cm).

δ is the value of the speed aberration angle to be compensated, caused by fast relative movement between the retroreflector 1 and the associated laser station, and let λ is the mean wavelength of the laser radiation to be retroreflected.

To provide omnidirectional correction corresponding to a given value of speed aberration the diffraction pattern of the CCR1 has an annular shape, of radius δ, with an energy distribution which is as homogeneous as possible.

In practice the speed aberration to be corrected varies with time, with the instantaneous relative orientations of the relative speed vector and the direction of the line linking the laser transmitter/receiver and the CCR1. For this reason speed aberration correction must be effected for a band of values typically extending between 0.8 times δ and 1.2 times δ, where δ is the mean value of the speed aberration to be compensated.

For example, this mean value δ is on the order of 3.5" of arc for a geostationary orbit (altitude 36,000 km) and on the order of 9" of arc for a low Earth orbit (altitude 400 km).

To obtain this annular shape, the present invention proposes that each surface of the CCR1 has a shape with at every point a difference relative to an imaginary exactly plane surface increasing in the direction away from an apex S of the CCR 1 by multiples of the wavelength λ.

To be more precise, this CCR 1 has three imaginary edges $z1$, $z2$ and $z3$ converging at the apex S and three mirror surfaces F1, F2 and F3 whose shape is at least approximately a portion of a cone C1, C2 or C3 C2 and C3 are not shown whose axis is coincident with the respective imaginary edge $z1$, $z2$ or $z3$.

P1, P2 and P3 are imaginary planes perpendicular to the respective imaginary edges $z1$, $z2$ and $z3$ and passing through the other two edges. All the generatrices of C1 (passing through S) are at an angle (or slope) $\alpha_1$ to P1, all the generatrices of C2 are at an angle $\alpha_2$ to P2 and all the generatrices of C3 are at an angle $\alpha_3$ to P3.

In other words, the surfaces F1, F2 and F3 are respectly characterized by a respective slope $\alpha_1$, $\alpha_2$ and $\alpha_3$.

The values of $\alpha_1$, $\alpha_2$ and $\alpha_3$ are preferably constant over all of the respective mirror surface F1, F2 and F3 (the generatrices are assumed rectilinear) and are equal to the same value $\alpha_0$.

Figure 2:
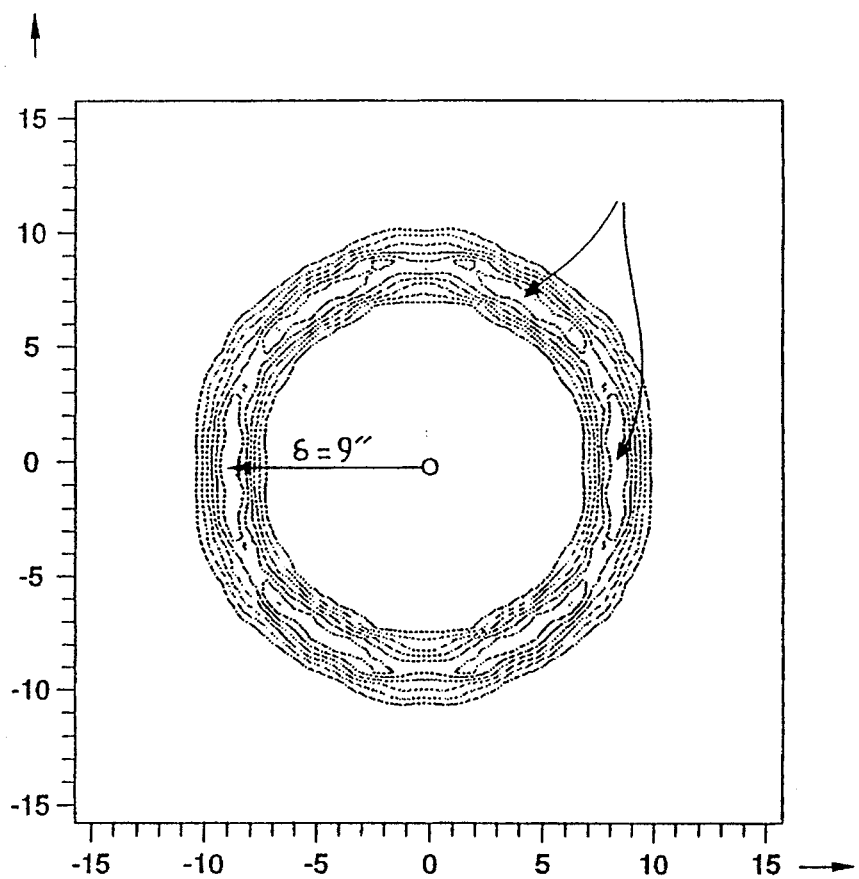
FIG. 2 shows the diffraction pattern of the retroreflector from FIG. 1 for normal incidence and a mean speed aberration correction of nine seconds of arc.
Figure 3:
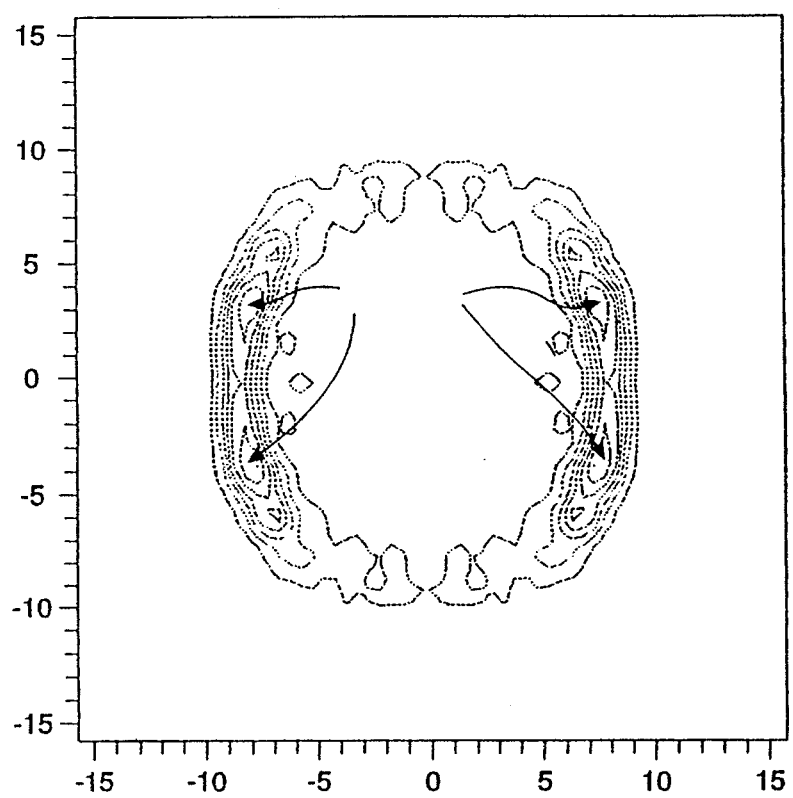
FIG. 3 is the same diffraction pattern for an incidence of 15° to the normal.

FIGS. 2 and 3 show diffraction patterns obtained by simulation for identical and exactly conical surfaces with a value of $\alpha_0$ equal to 1.8" for angles of incidence of 0° and 15° to the normal of the CCR 1 (i.e. the direction passing through S and at the same angle to each of the three edges). The CCR was hollow and had an entry diameter of 100 mm; the incident radiation had a wavelength of 500 mm.

These figures yield approximately the same value for δ, such that:

$$\alpha_0 = 0.20\ \delta$$

This equation can be demonstrated.
The previous equation can be generalized in the form:

$$\alpha_0 = 0.2\ \delta/k$$

where k is a predetermined geometrical parameter depending on the number, the geometry and the refractive index of the material(s) constituting the interior volume of the retroreflector.

In the aforementioned case of an entirely hollow CCR, the coefficient $k$ is equal to the refractive index of empty space, i.e. $k=1$.

It can be shown that if the radiation crosses a transparent homogeneous material between the three surfaces with a refractive index $n$ (relative to empty space), for example if the CCR is solid, the previous equation becomes:

$$k = n \cdot \frac{\cos[\text{Arcsin}((\sin i_o)/n)]}{\cos i_o}$$

where $i_0$ is the mean angle of incidence relative to the normal to the CCR 1; for a maximal angle of incidence of 40° the value of $i_0$ is around 30°; an approximate expression for the above equation is:

$$k \sim 1.09\ n$$

On the other hand, if the retroreflector 1 is mainly hollow and the mirror surfaces are formed on the rear of homogeneous plates with the same refractive index $n$, for example, it can be shown that:

$$k = \sqrt{3} \cdot \cos[\text{Arcsin}(\sqrt{2/3} \cdot 1/n)]$$

The width of the annular shape of the aforementioned diffraction patterns ( FIGS. 2 and 3 ) is about 1.5" (it is inversely proportional to the diameter of the CCR).

This annular shape can be made wider by varying the general (or local) value α of the generatrix slope in each surface, for example by "curving" the generatrices of the cone (e.g. by imparting a parabolic variation to their local slope) or by imparting an undulating shape to the surfaces (the generatrices being rectilinear but having different slopes from one generatrix to the next). If the extreme values of α are $\alpha_{min}$ and $\alpha_{max}$, it can be shown that the additional widening Δ of the ring for a monotonous variation of the slope α is given in the case of a hollow CCR by the following approximate equation:

$$\Delta \sim 5\ (\alpha_{max} - \alpha_{min})$$

The person skilled in the art will know that the simplicity of the above equation conceals a rigorous but more complex form of the diffraction calculation using a FOURIER transform.

The parameters; $\alpha_1$; $\alpha_2$ and $\alpha_3$ denote the average slopes of the surfaces F1, F2 and F3.

In FIG. 1 the angles $\alpha_1$, $\alpha_2$ and $\alpha_3$ are such that the convex sides of the surfaces face towards the normal of the CCR 1, i.e. towards the rays to be retroreflected.

The same results are obtained if all the surfaces have their concave side facing towards the normal.

It is not necessary for the angles $\alpha_1$, $\alpha_2$ and $\alpha_3$ to be exactly equal (in which case $\alpha_0$ denotes the average of the average slopes of the surfaces $\alpha_1$, $\alpha_2$, $\alpha_3$); it is even tolerable for one of the surfaces to be plane. This is explained in more detail below.

Implementing polished conical surfaces is not particularly easy; for this reason the invention proposes various approximations of such surfaces.

Firstly, the conical shape can be approximated by the juxtaposition of a plurality of plane facets each having a non-null (preferably the same) angular offset relative to the imaginary plane P1, P2 or P3. Of course, the overall angle subtended by the facets of a surface (i.e., the angular extent of the surface) is 90° (the resulting geometry resembles that of a very flattened umbrella with straight ribs).

Preferably, but not necessarily, the facets are identical, subtend the same angle (90°/N if there are N facets) and have the same average slope $\alpha_{sfij}$ where $i$ is the number of the facet concerned and $\underline{i}$ is the number of the surface concerned.

It is evident that the accuracy of this approximation of the required conical surface is directly proportional to the number of facets.

However, it would seem that an approximation by only two facets is entirely satisfactory for a CCR diameter in the order of 10 cm and at wavelengths in the visible spectrum (400 nm to 700 nm). In the case of a substantially larger diameter CCR, it may be necessary to increase the number N of facets to maintain a sufficient circumferential uniformity of the diffraction ring.

FIG. 4 shows a surface F'1 of this kind having a break K between two facets SF1 and SF2.

$\alpha_{kij}$ are the angles (or slopes) between the various edges of the plane facets and the imaginary plane $P_j$ of the surface $F'_j$, where $\underline{i}$ takes the value 0 (for one of the edges j) or the number of the facet in question (for all the edges—for example the righthand edges—of the facets); $\alpha_{bij}$ is the slope relative to $P_j$ of facet $\underline{i}$ of surface j. The angles are therefore, from left to right in FIG. 4: $\alpha_{k01}$, $\alpha_{b11}$, $\alpha_{k11}$, $\alpha_{b21}$ and $\alpha_{k21}$.

The angles $\alpha_{kij}$ for each surface (and thus for the same value of j) are preferably equal to a common value $\alpha_{kj}$; if the same subtended angle is chosen for the facets, the angles $\alpha_{bij}$ are preferably equal for each surface to a common value $\alpha_{bj}$. It can be shown that $\alpha_{kj} < \alpha_j < \alpha_{bj}$ where $\alpha_j$ is as previously the average slope of the surface in question. The differences are slight. Thus in the case considered here of two identical facets, it can be shown that:

$\alpha_{kj} = 0.948 \alpha_j$ $\alpha_{bj} = 1.026 \alpha_j$.

The following description assumes that the aforementioned preferred conditions are met and the notation is simplified by eliminating the index j (this simplified notation is the exact notation if the surfaces are identical).

$\psi_0$ is the angle between the bisector of a facet and each of its edges:

$\psi_0 = 90°/2N$

It can be shown that for any number $\underline{N}$ of facets the break angle between identical adjacent facets is:

$\gamma_0 = 2 \alpha_k \cdot \tan \psi_0$

Of course, this angle tends towards zero as $\underline{N}$ increases.

In practice, conventional interferometry techniques can easily be used to check the break angle between two adjacent facets.

It can be shown that it is possible to write, for any value of $\underline{N}$:

$\alpha_k = \alpha_b \cos \psi_0$

It is possible to deduce from this that with two facets, i.e. for $\psi_0 = 22.5°$, there is a difference in the order 7.6% between the values of the two angles $\alpha_b$ and $\alpha_k$. This confirms that only two facets per surface already gives a good approximation of a conical surface, all the more so in that it could be beneficial (for widening the diffraction ring) to have fluctuations in slope from one edge to the other of a given surface (see above).

Consequently, although it might seem more logical to refer the design to $\alpha_j$, it is substantially equivalent to assign any of the angles $\alpha_b$ or $\alpha_k$ the value 0.2 δ/k given above with reference to the conical shape.

Figure 5:
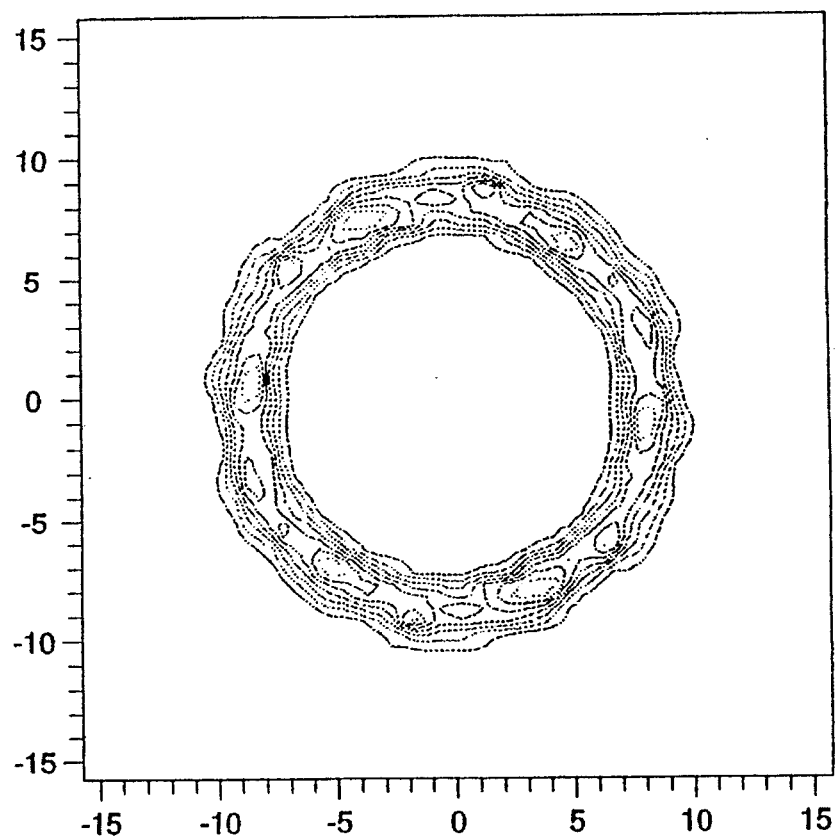
FIG. 5 shows the normal incidence diffraction pattern for a retroreflector in which each surface is as shown in FIG. 4.
Figure 6:
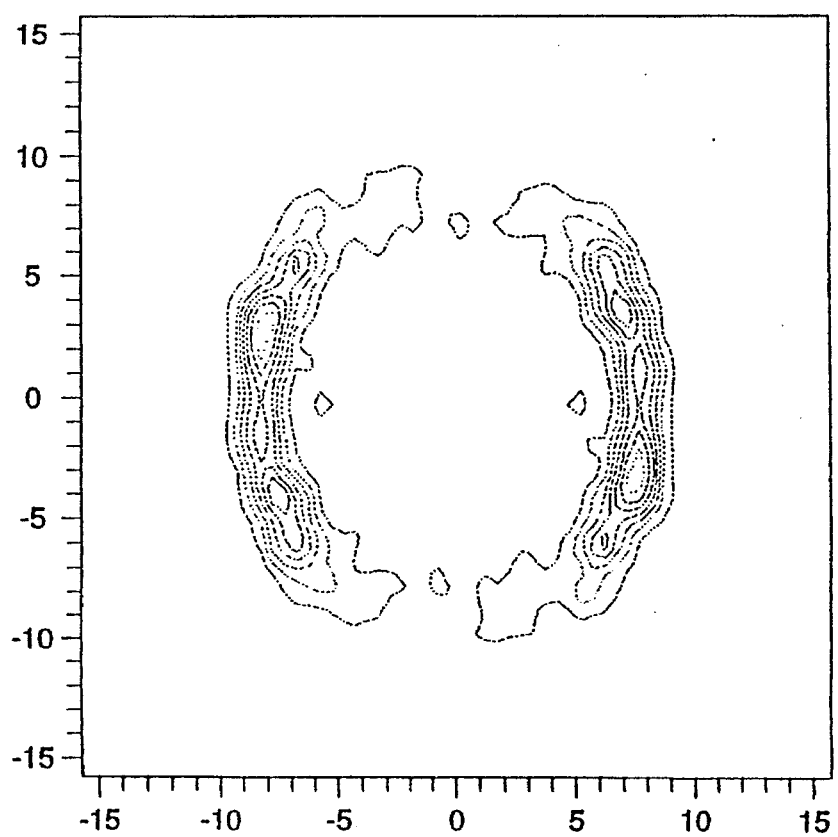
FIG. 6 shows a diffraction pattern for the same retroreflector of FIG. 4 for an angle of incidence of 15°.

FIGS. 5 and 6 show diffraction patterns obtained by simulation with a retroreflector in which each of the three surfaces is formed by two plane facets in which the edge inclination is $\alpha_1 = 1.8"$. As in FIGS. 2 and 3, the diameter of the CCR was 10 cm and the wavelength of the radiation was 500 nm.

For a normal incidence of radiation, the resulting diffraction pattern (see FIG. 5) is very similar to those of FIGS. 2 and 3; it enables a speed aberration correction of 9".

For an incidence of 15° relative to the normal of the CCR the diffraction pattern is divided into two half-rings again with a radius close to 9". The speed aberration correction is no longer entirely omnidirectional; however, echos are obtained for a very large number of orientations of the relative speed between the T/R and the CCR.

Slightly better results will be obtained with three facets per surface.

The surfaces (and the facets) are triangular in this example, conforming to the usual retroreflector geometry. However, it is clear that the results stated here would not be significantly changed if the surfaces or the facets had a different, e.g. polygonal or rounded (sector) shape.

As stated above, it may be assumed that the surfaces have different slopes from one generatrix to another or along the same generatrix provided that the average slope of the surfaces conforms to the relationship to δ given above, i.e. if the average value $\alpha_0$ is at least approximately equal to 0.20 δ for a hollow CCR.

Figure 7:
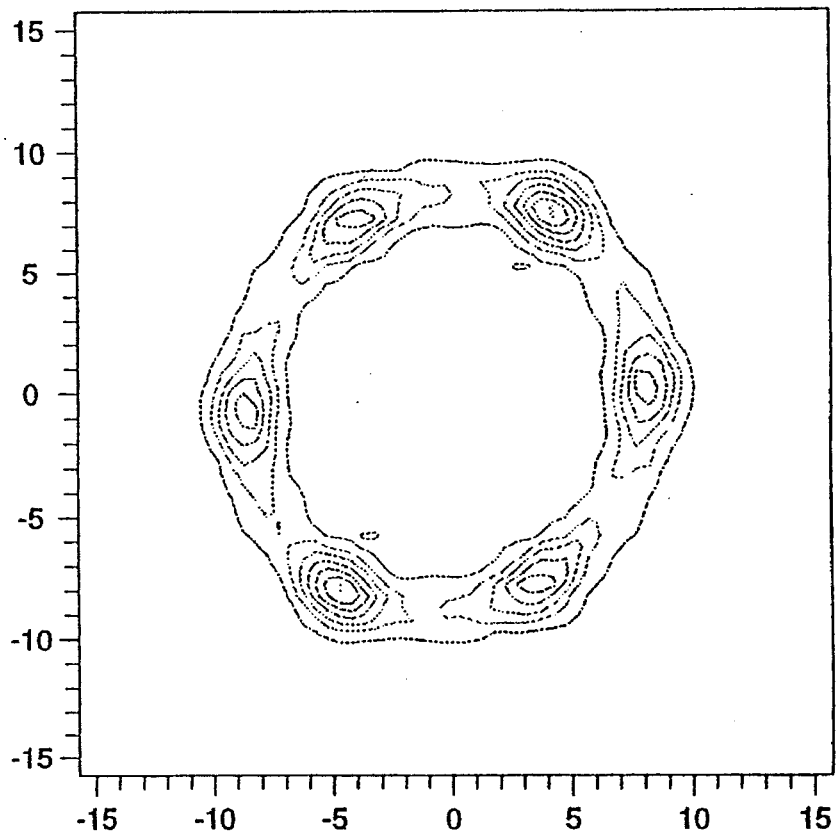
FIG. 7 shows the normal incidence diffraction pattern for another retroreflector whose surfaces have different inclinations.

FIG. 7 shows the diffraction pattern obtained for normal incidence with a retroreflector having two facets per surface, the slopes having the following values:

$\alpha_0 = 0.7 \alpha_0$ for one surface, $\alpha_2 = \alpha_3 = 1.15 \alpha_0$ for the other two surfaces, where $\alpha_0$ is the nominal value given by the aforementioned equation:

$\alpha_0 = 0.2 \delta / k$

It can be shown that this value $\alpha_0$ is the average of the aforementioned inclinations for the three surfaces.

Note that the resulting diffraction pattern is slightly elliptical, with a distribution of energy all around the ring (even though six lobes can clearly be seen).

Figure 8:
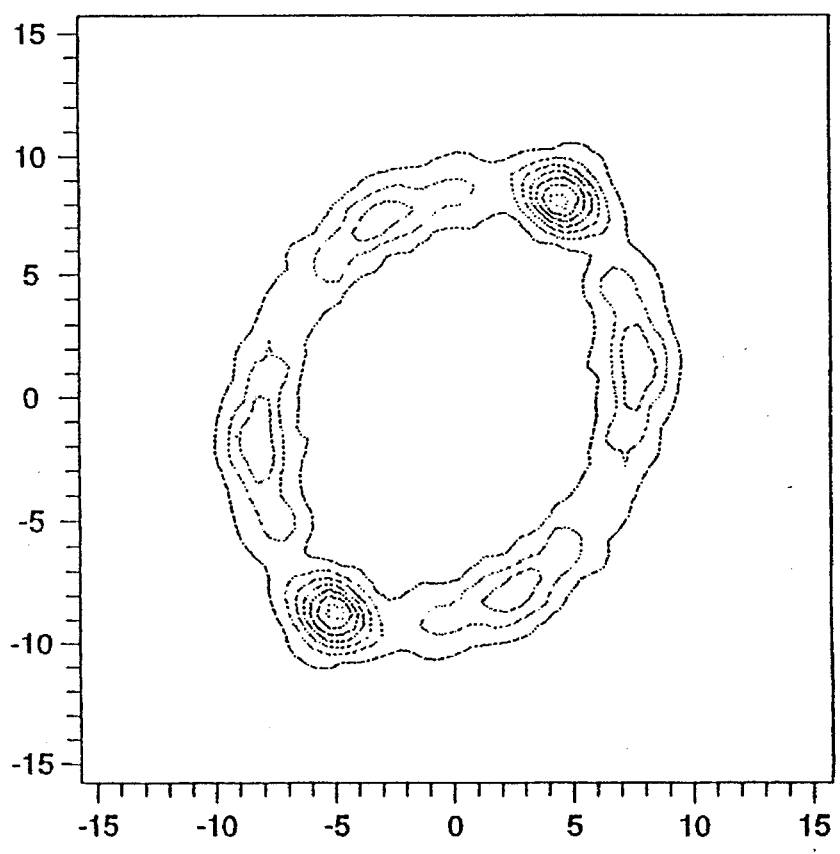
FIG. 8 shows a normal incidence diffraction pattern for a retroreflector whose surfaces have inclinations differing more than the equivalent inclinations in FIG. 7.

FIG. 8 shows the diffraction pattern for normal incidence for a retroreflector with two facets per surface and with the following inclinations:

$\alpha_1 = 0$ for one surface, $\alpha_2 = \alpha_3 = 1.5 \alpha_0$ for the other surfaces, where $\alpha_0$ is the theoretical value of the inclination, as previously set forth.

Note that the diffraction pattern is even more elliptical, with an even less homogeneous energy distribution (two main lobes are seen).

It seems reasonable to deduce from these patterns that differences in slope up to around 30% of the nominal value $\alpha_0$ can be tolerated for the surfaces or facets (regarding the FIG. 7 pattern as satisfactory), provided that the real average of the various slopes of the surfaces are substantially equal to (for example within 10% of) this nominal value. For a given surface, the local slope of any generatrix passing through the apex must be close to (in practice within 20% of) the average value for that surface.

If the actual average value of the slopes is greater than the nominal value $\alpha_0$, the retroreflector would be able to correct greater speed aberrations. Correction of smaller values of aberration would be preferable if the average value for the three values $\alpha_1$, $\alpha_2$ and $\alpha_3$ were less than $\alpha_0$.

Note that the inclinations or slopes $\alpha_{kij}$ are measured with the same sign conventions relative to the normal of the CCR so that the surfaces are all concave or all convex, as already mentioned.

It seems that obtaining a diffraction pattern of the required size results from the difference in optical path induced at each reflection by the distance between the point of reflection and the ideal plane surface (i.e. a plane surface perpendicular to the axis $z1$ at the apex S, i.e. relative to the plane P1). On the other hand, the local orientation of the normal to the surface at the reflection point is much less important; this is why the local or general slope of the generatrices of the surfaces can be approximated by a succession of steps.

FIGS. 9 and 10 show a surface formed by a series of coaxial annular steps M1, M2, . . . parallel to the plane of the page offset relative to each other perpendicular to the plane of the page to approximate the required local slope $\alpha$.

Alternatively, the surfaces or facets are formed of rectilinear rather than annular steps.

FIG. 11 shows another embodiment in which the generatrix of the facets is divided into sections which globally have the required slope $\alpha$, separated by transitions whose height causes a phase-difference which is a multiple of $2\pi$ (due to the optical path difference).

A "diffractive" or "holographic" approach can be applied to reasoning about the spatial phase distribution of the light wave reflected (or transmitted) by the CCR in question; the diffraction calculations allow for the phase of the wave to be refracted, to the nearest multiple of $2\pi$.

In other words, if the required slope for the ideal conical surface implies a variation in optical path difference along a generatrix between 0 and $2\lambda$ (which corresponds to a phase varying between 0 and $4\pi$), the same phase variations are obtained with two transitions of height $2\pi$.

The aforementioned steps can be machined using a diamond-faced machine tool (a "MOORE" machine, for example) or by photo-etching.

For example:

$\delta=10"$ global slope of steps $\alpha_0=2"$ surface side length: 10 cm transition height (phase-shift of $2\pi$ for a wavelength of 500 nm): 500 nm approx.

All of the foregoing description uses reasoning with reference to the imaginary edges.

As emerges from FIG. 1, for example, the departures from flatness of the surfaces mean that the edges of the surfaces are not contiguous if the angle subtended by the surfaces is exactly 90°. In practice the surfaces extend beyond 90° (or short of 90° if the surfaces are concave) until they intercept the other surfaces at real edges; note that these surfaces do not meet at an exact right angle along these real edges. If the three values $\alpha_1$, $\alpha_2$ and $\alpha_3$ are all equal to $\alpha_0$, the defect is equal to the angle $\gamma$ given by the expression stated above.

It goes without saying that the foregoing description has been given by way of non-limiting example only and that numerous variations will suggest themselves to the person skilled in the art that do not depart from the scope of the invention.

In the case of a more generalized use of this concept of CCR with omnidirectional speed aberration correction, various scenarios are feasible in which reflectors are placed on the Earth or another heavenly body with a transmit/receive station in orbit around the latter. Generating an annular diffraction pattern is beneficial if the relative orientation of the CCR (about its normal) to the apparent motion of the orbiting T/R (transmitter/receiver) is not known or is not known accurately.

This could be the case in the following situations, for example.

In association with an orbiting T/R, with a known inclination to the planet (Earth or other planet), the CCR are disposed with no precise orientation relative to the relative movement between the T/R and the planet.

CCR are placed on a planet (the Earth or another planet)—possibly even in a perfectly accurately known and controlled way—at high latitudes and are then targeted from a T/R satellite in polar or quasi-polar orbit. In this situation, the relative speed vector between the CCR and the T/R changes its orientation with time.

CCR are disposed on a planet—possibly even in a perfectly accurately known and controlled manner—at any latitude and are then targeted from a plurality of T/R satellites in orbits with diverse and varied inclinations.

There is claimed:

1. A cube-corner retroreflector having an interior volume, for laser telemetry adapted to correct a speed aberration ($\delta$) comprising:

three mirror surfaces extending from a common apex;

wherein each mirror surface of said three mirror surfaces has a portion of a cone having a cone apex coincident with said common apex, a cone axis including said common apex and generatrices, each generatrix extending from said common apex and having a generatrix slope relative to a respective imaginary plane perpendicular to said cone axis and including said common apex, said generatrix slope having a local slope value along each generatrix of said generatrices which is within 20% from an average generatrix slope value of said each generatrix, and said generatrices determining for each said mirror surface an average mirror surface slope value;

said average mirror surface slope value of a first mirror surface of said three mirror surfaces is non-null;

said cone axes of each mirror surface of said three mirror surfaces are orthogonal to each other;

said average mirror surface slope value of each mirror surface of said three mirror surfaces is within 30% from an average slope value ($\alpha_0$); and said average slope value $\alpha_0$ satisfies the equation $\alpha_0=0.2\delta/k$ where $k$ is a predetermined parameter dependent on the number, the geometry and the refractive index or indices of the media constituting said interior volume of said retroreflector.

2. A retroreflector according to claim 1 wherein each said average mirror surface slope value is non-null and wherein each said mirror surface of said three mirror surfaces has a concave side facing in a direction into said interior volume.

3. A retroreflector according to claim 15 wherein said first mirror surface is formed by at least two triangular plane facets contiguous at a break line, each of said at least two triangular plane facets having edges extending from said common apex and having substantially equal slopes relative to a plane perpendicular to said cone axis of said first mirror surface of said three mirror surfaces.

4. A retroreflector according to claim 3 wherein each mirror surface of said three mirror surfaces is made up of substantially identical facets.

5. A retroreflector according to claim 3 wherein each mirror surface of said three mirror surfaces is made up of two identical facets.

6. A retroreflector according to claim 2 wherein each mirror surface of said three mirror surfaces is identical.

7. A retroreflector according to claim 2 wherein said generatrices of each mirror surface comprises at least one succession of coaxial steps, wherein two adjacent steps of said succession of coaxial steps define said local generatrix slope.

8. A retroreflector according to claim 7 wherein each said mirror surface includes at least two successions of parallel steps separated by a transition having a height parallel to said cone axis of said mirror surface and corresponds to a phase difference equal to a multiple of $2\pi$ at least equal to one.

9. A retroreflector according to claim 2 wherein said local slope of said generatrices of said first mirror surface of said three mirror surfaces varies with its distance from said common apex.

10. A retroreflector according to claim 9 wherein said local slope value varies monotonously.

11. A retroreflector according to claim 2 wherein each said mirror surface of said three mirror surfaces has first and second edges, said generatrix slope of said generatrices of each said mirror surface of said three mirror surfaces varies circumferentially between said first and second edges of each said mirror surface.

12. A retroreflector according to claim 2 wherein said interior volume of said retroreflector is empty and said coefficient $\underline{k}$ has a value equal to 1.

13. A retroreflector according to claim 2 wherein said interior volume of said retroreflector is constituted by a homogeneous material of refractive index $\underline{n}$ and said coefficient $\underline{k}$ has a value given by the equation $$k = n \cdot \frac{\cos[\text{Arcsin}((\sin i_o)/n)]}{\cos i_o}$$

where $i_0$ is at least approximately 30°.

14. A retroreflector according to claim 2 wherein said interior volume includes homogeneous plates having a refractive index $\underline{n}$ at each said mirror surface and which is empty between said homogeneous plates and wherein said coefficient $\underline{k}$ has a value given by the equation:

$$k = \sqrt{3} \cdot \cos[\text{Arcsin}(\sqrt{2/3} \cdot 1/n)].$$

* * * * *

UNITED STATES PATENT AND TRADEMARK OFFICE
CERTIFICATE OF CORRECTION

PATENT NO. : 5,570,230
DATED : October 29, 1996
INVENTOR(S) : Glenn Lund

It is certified that error appears in the above-indentified patent and that said Letters Patent is hereby corrected as shown below:

Title Page, item [57], Abstract, delete "$\alpha_0 \sim 0.2\delta/k$" insert ---- $\alpha_0 \simeq 0.2\delta/k$ ----.

Column 1, line 16, after "present" insert ---- , ----.

Column 3, line 12, delete "Europen" insert ----European ----.

Column 3, line 39, delete "of".

Column 4, line 34, delete "$0.2\delta/k$" insert ---- $\alpha_0 = 0.2\delta/\underline{k}$ ----.

Column 4, line 48, after "identical" insert ---- . ----.

Column 4, line 61, delete "surface," insert ---- surface. ----.

Column 4, line 62, delete "preferably" insert ---- Preferably ----.

UNITED STATES PATENT AND TRADEMARK OFFICE
CERTIFICATE OF CORRECTION

PATENT NO. : 5,570,230
DATED : October 29, 1996
INVENTOR(S) : Glenn Lund

It is certified that error appears in the above-indentified patent and that said Letters Patent is hereby corrected as shown below:

Column 4, line 62, delete the paragraph indentation.

Column 4, line 64, after "alternatively" insert ---- , ----.

Column 4, line 65, delete the paragraph indentation.

Column 7, line 3, delete "let".

Column 7, line 8, delete "CCR1" insert "CCR 1".

Column 7, line 13 delete "CCR1" insert "CCR 1".

Column 7, line 22, delete "CCR1" insert "CCR 1".

Column 7, line 38, delete "respectly" insert ---- respectively ----.

UNITED STATES PATENT AND TRADEMARK OFFICE
CERTIFICATE OF CORRECTION

PATENT NO. : 5,570,230
DATED : October 29, 1996
INVENTOR(S) : Glenn Lund

It is certified that error appears in the above-indentified patent and that said Letters Patent is hereby corrected as shown below:

Column 8, line 13, delete "$k\sim 1.09\ n$" insert ---- $k\simeq 1.09\ n$ ----.

Column 8, line 37, delete "$\Delta\sim 5(\alpha_{max} - \alpha_{min})$" insert ---- $\Delta\simeq 5(\alpha_{max} - \alpha_{min})$ ----.

Column 8, line 43, delete "; $\alpha_1$;" insert ---- $\alpha_1'$ ----.

Column 9, line 1, delete "i" insert ---- j ----.

Column 12, line 50, delete "claim 15" insert ---- claim 2 ----.

Signed and Sealed this

Fifteenth Day of July, 1997

Attest:

BRUCE LEHMAN

Attesting Officer

Commissioner of Patents and Trademarks